Nov. 24, 1964   C. E. TACK ETAL   3,158,414
RAILWAY TRUCK SIDE BEARING
Filed Oct. 3, 1962

INVENTORS.
Carl E. Tack
Fred E. Bachman
By Walter F. Schlegel Jr.
Atty.

Witness:
C. H. Bassett

United States Patent Office 3,158,414
Patented Nov. 24, 1964

3,158,414
RAILWAY TRUCK SIDE BEARING
Carl E. Tack, Elmhurst, and Fred E. Bachman, Chicago, Ill., assignors to Amsted Industries Incorporated, Chicago, Ill., a corporation of New Jersey
Filed Oct. 3, 1962, Ser. No. 228,096
5 Claims. (Cl. 308—138)

This invention relates to railway car trucks and more particularly to side bearings adapted to be mounted on a bolster to yieldably resist lateral tilting of a car body.

An object of the invention resides in the provision of a side bearing adapted to resist harmonic roll of a car body and the build-up of excessive side bearing pressure.

Another object of the invention resides in the provision of a side bearing adapted to prevent truck shimmying and nosing, to thereby improve the riding quality of the equipment and to prolong the useful life of the wheels.

A further object of the invention resides in the provision of a side bearing embodying friction snubbing means adapted to cushion movements of a car body relative to a truck bolster.

Another object of the invention resides in the provision of a side bearing embodying a base adapted to be secured to a truck bolster, a cover resiliently supported on the base and adapted to engage the underside of a car body, and friction shoes biased against the cover and friction surfaces on the base to snub movements of the cover relative to the base.

Another object of the invention resides in the provision of a side bearing in which the base is formed with side and end walls, and two friction shoes are biased in opposite directions to frictionally engage their respective side and end walls.

Another object of the invention resides in the provision of a side bearing which is relatively inexpensive to manufacture.

The invention embodies other novel features, details of construction and arrangement of parts which are hereinafter set forth in the specification and claims and illustrated in the accompanying drawings, forming part thereof, wherein:

Figure 1:
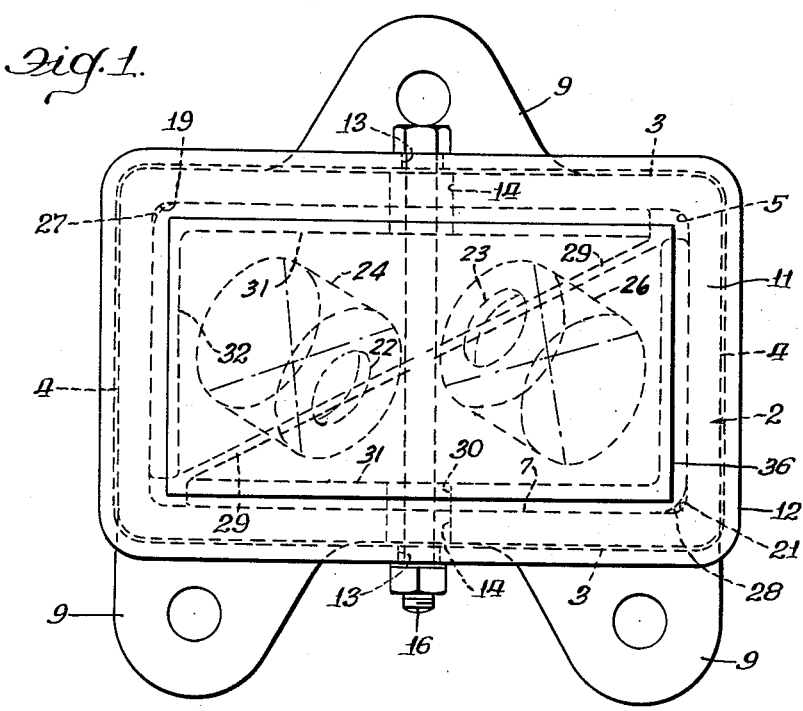
FIGURE 1 is a top plan view illustrating a side bearing embodying features of the invention.
Figure 2:
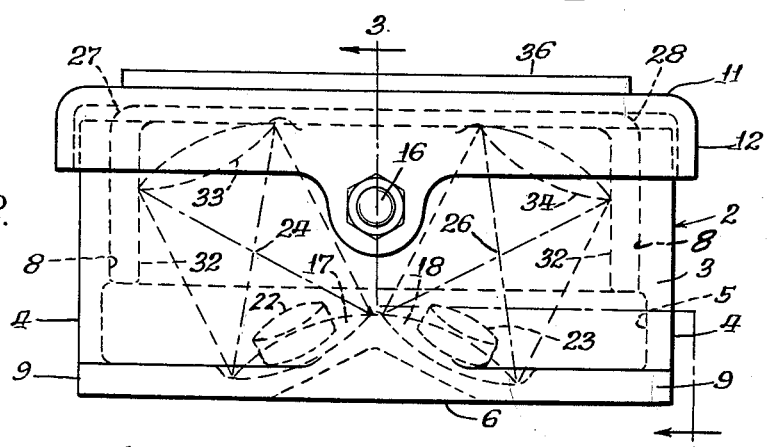
FIGURE 2 is a side elevation of the side bearing.
Figure 3:
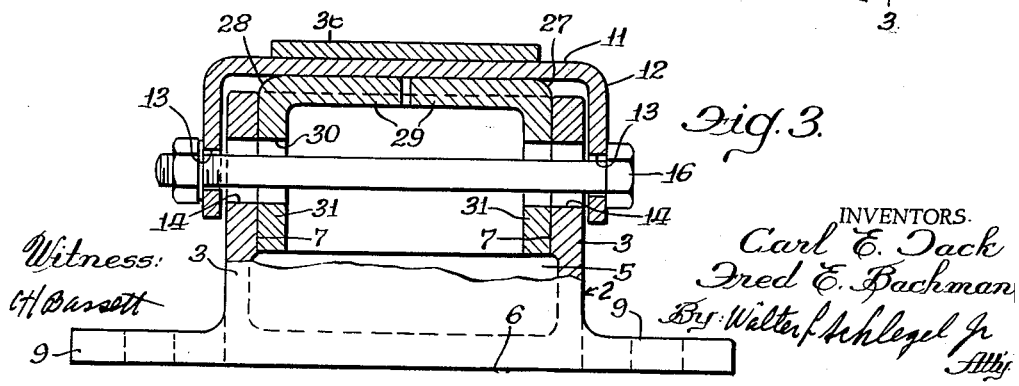
FIGURE 3 is a transverse section, partly in end elevation, taken along the line 3—3 of FIGURE 2.

Referring now to the drawings for a better understanding of the invention, the side bearing is shown as comprising a base 2 having a chamber 5 defined by side walls 3 and end walls 4 extending upwardly from a bottom 6. Flat parallel friction surfaces 7 are formed on the inner sides of the side walls 3; and flat parallel friction surfaces 8 are formed on the inner sides of the end walls 4. The base is provided with suitable bolt flanges 9 for securing the base to a truck bolster.

A flat cover 11 is formed with a depending marginal flange 12 to enclose the upper end of the base 2, the flange being formed with apertures 13 in registry with openings 14 in the side walls 3 to receive a bolt 16. It will be noted that the openings 14 are formed to permit limited vertical movement of the cover and bolt relative to the base.

The bottom 6 is formed with two inclined spring seats 17 and 18 facing upwardly in opposite directions toward their adjacent diagonal corners 19 and 21 of the chamber 5, the spring seats being formed with spring retaining bosses 22 and 23 to engage the lower ends of their respective compression springs 24 and 26.

Two identical friction shoes 27 and 28 are mounted within the chamber 5, each shoe comprising a flat triangular-shaped top wall 29 and depending flat rectangular-shaped side and end flanges 31 and 32, respectively, the side flanges being formed with bolt holes 30. The top walls of the shoes 27 and 28 are formed with inclined spring seats 33 and 34, respectively, to engage the upper ends of their respective springs 24 and 26. A flat wear member 36 of composition brake lining material is bonded to the upper surface of the cover 11 for engagement against the underside of a car body.

In operation, two side bearings of the type shown and described are securely mounted on the truck bolster adjacent the ends thereof for engagement by the underside of a car body, the free height of the bearings being reduced, for example, approximately one-fourth of an inch when the car body is supported in its normal level position upon the bolster to position the bolt 16 centrally within the openings 14 and bolt holes 30. The springs 24 and 26 are under compression between the base 2 and the cover 11 and act to bias the shoes 27 and 28 upwardly and outwardly toward the diagonal corners 19 and 21 of the chamber 5 to frictionally engage the side and end flanges 31 and 32 against the friction surfaces 7 and 8 to snub movements of the car body relative to the bolster. Due to the snubbing action of the friction shoes, it will be noted the side bearings are adapted to prevent shimmying and nosing to thereby improve the riding quality of the equipment and to prolong the useful life of the wheels.

We claim:

1. In a railway truck side bearing, a base having a chamber defined by a bottom, side walls and end walls, a cover enclosing the upper end of said base, two friction shoes in said chamber and having flat triangular-shaped top walls and depending side and end flanges, and resilient means seated on said bottom and acting to urge said shoes against said cover and toward diagonal corners of said chamber to frictionally engage said flanges against their respective side and end walls, said means comprising two helical compression springs having their axes diverging upwardly toward diagonal portions of the chamber.

2. In a railway truck side bearings, a base having a chamber defined by a bottom, side walls and end walls, a cover enclosing the upper end of said base, two friction shoes in said chamber and having flat triangular-shaped top walls and depending side and end flanges, and resilient means seated on said bottom and acting to urge said shoes against said cover and toward diagonal corners of said chamber to frictionally engage said flanges against their respective side and end walls, said means comprising two helical compression springs having their axes diverging upwardly toward diagonal portions of the chamber, said bottom having inclined spring seats facing inclined spring seat surfaces on said shoes.

3. In a railway truck side bearing, a base having a chamber defined by a bottom, side walls and end walls, a cover enclosing the upper end of said base, two friction shoes in said chamber and having flat triangular-shaped top walls and depending side and end flanges, and resilient means seated on said bottom and acting to urge said shoes against said cover and towards diagonal corners of said chamber to frictionally engage said flanges against their respective side and end walls, said means comprising two helical compression springs having their axes diverging upwardly toward diagonal portions of the chamber, said bottom having inclined spring seats facing inclined spring seat surfaces on said shoes, and a bolt to limit movement of said cover relative to said base.

4. In a railway truck side bearing, a base having a chamber defined by a bottom, side walls and end walls, a cover enclosing the upper end of said base, two friction shoes in said chamber and having flat triangular-shaped top walls and depending side and end flanges, and resilient means seated on said bottom and acting to urge said shoes against said cover and toward diagonal corners of said chamber to frictionally engage said flanges against their respective side and end walls, said means comprising two helical compression springs having their axes diverging upwardly toward diagonal portions of the chamber, said bottom having inclined spring seats facing inclined spring seat surfaces on said shoes, and a bolt to limit movement of said cover relative to said base, said bolt being mounted on said cover and extending through apertures in said side walls.

5. In a railway truck side bearing, a base having a chamber defined by a bottom, side walls and end walls, a cover enclosing the upper end of said base, two friction shoes in said chamber and having flat triangular-shaped top walls and depending side and end flanges, and resilient means seated on said bottom and acting to urge said shoes against said cover and toward diagonal corners of said chamber to frictionally engage said flanges against their respective side and end walls, said means comprising two helical compression springs having their axes diverging upwardly toward diagonal portions of the chamber, said bottom having inclined spring seats facing inclined spring seat surfaces on said shoes, and a bolt to limit movement of said cover relative to said base, said bolt being mounted on said cover and extending through apertures in said side walls and side flanges.

References Cited in the file of this patent
UNITED STATES PATENTS

| | | |
|---|---|---|
| 2,197,783 | Barrows | Apr. 23, 1940 |
| 2,828,169 | Schulz | Mar. 25, 1958 |